Dec. 19, 1967  W. C. HARDY ET AL  3,358,758
SECONDARY RECOVERY OF PETROLEUM
Filed Aug. 12, 1963
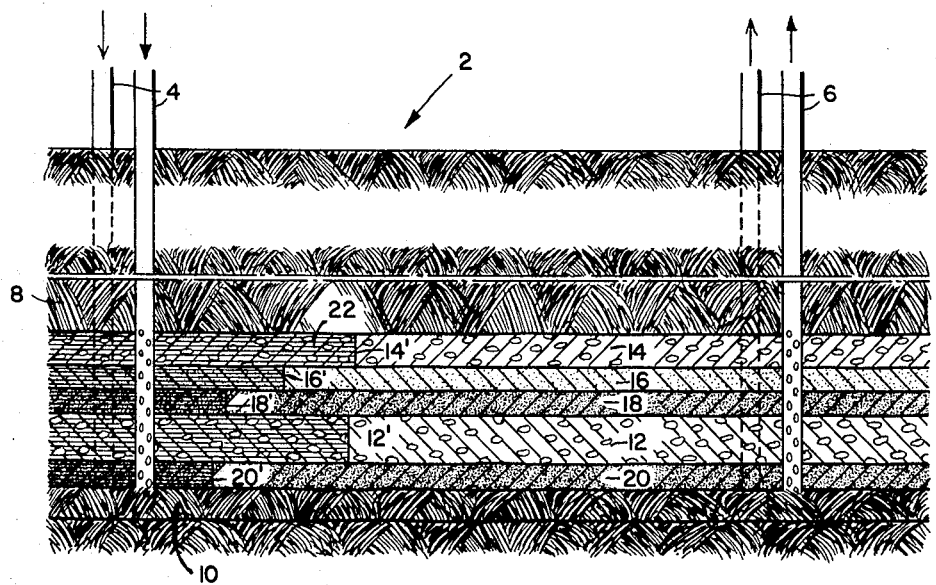
INVENTORS
WILLIAM C. HARDY &
HORACE R. CRAWFORD
BY
ATTORNEYS

United States Patent Office 3,358,758
Patented Dec. 19, 1967

3,358,758
SECONDARY RECOVERY OF PETROLUEM
William C. Hardy and Horace R. Crawford, Richardson, Tex., assignors to Sun Oil Company, Philadelphia, Pa., a corporation of New Jersey
Filed Aug. 12, 1963, Ser. No. 301,299
1 Claim. (Cl. 166—10)

This invention relates to the secondary recovery of petroleum and has particular reference to improving the drive of oil-containing fluid located in heterogeneous formations.

So-called secondary recovery methods involve the drive of the oil-containing fluid (hereafter referred to as the driven fluid and containing petroleum oil and/or water and/or gases) from the reservoir rock into producing wells by driving fluids such as water or gas which are injected into the reservoir through injection wells, both types of wells being properly located within its extent. Many variations of such methods are known, sometimes involving the provision of slugs of various fluids between the driven fluid and the driving fluid.

The effectiveness of oil recovery by such methods depends upon many factors, but one which is quite important is the degree of heterogeneity of the reservoir rock. The heterogeneity of significance in connection with the present invention is that which may be most generally stated as involving stratification or lamination of the rock in the direction in which flow is desired, with the stratification involving layers varying quite considerably in permeability. The problem which is presented by this situation is easily evident: a layer of high permeability will offer low hydraulic resistance to flow of both the driven and the injected driving fluid, while a layer of low permeability will offer a high resistance to flow. If layers of these various types all contain oil, as is usual, the advance of material through the high permeability layers will be much greater than through the low permeability layers, resulting in premature breakthrough and arrival of injected fluid at the production wells. Once this occurs, further injection of driving fluid will ordinarily take place substantially only through the higher permeability layers, bypassing the low permeability layers which may well have had their oil content displaced only to a relatively small extent.

The condition detrimental to production which has just been outlined has been recognized in the art, and attempts have been made to shut off or plug the high permeability layers at either or both of the injection and producing wells. It can be readily seen that such a procedure is, at best, only effective to a quite limited degree. While stratification usually produces a condition of higher permeability in directions parallel to the stratification as compared with directions transverse thereto, the vast extent of area existing in a usual oil reservoir provides "leakage" of flow from low permeability layers to adjacent high permeability layers through their interfaces, so that, in effect, while streamlines of flow may start out from an injection will along a low permeability layer (adjacent high permeability layers being blocked off) they will gradually deviate through boundaries into higher permeability layers and proceed, preferentially, therealong, with the result that again the flow which takes place will be largely through the layers of higher permeability, with little or no flow through major regions of the low permeability layers.

In accordance with the present invention the adverse conditions are rectified by the provision in the vicinity of one or more injection wells of a viscous mobile slug which will form a boundary between the driven fluid and the driving fluid. As will appear hereafter, this slug will have greater extent in the direction of flow within the more permeable layers than in the less permeable layers. The viscosity of the slug offers frictional resistance to flow, to overcome which a substantial pressure gradient is necessary. The resistance offered is an increasing function with the extent of the slug in the direction of flow. Once the slug is set up, therefore, a given pressure gradient between the injection wells and the production wells will result in a more nearly equal rate of displacement in the layers of different permeabilities. Thus a more uniform sweep of all of the permeable layers is produced, resulting in a higher overall removal of the desired oil from the reservoir.

The objects of the invention have to do with the effective drive of petroleum from layers of different permeabilities, and these will become more evident from consideration of the following description of the process with reference to the accompanying drawing in which the figure is a highly conventionalized diagram of a vertical section of an oil reservoir taken between injection and production wells.

The reservoir is generally indicated at 2. A plurality of injection wells are indicated at 4, and a plurality of production wells at 6. The injection wells may be of any of the usual types, though for special purposes, appearing later, they may involve two separate injection passages defined by the tubing and the annulus between the tubing and the casing. As is usual, multiple wells are thus provided strategically located in accordance with knowledge of the reservoir dimensions and characteristics in order to provide most effective removal of oil. While, as will be evident to those skilled in the art, the reservoir may be of any one of many types, it may be assumed for simplicity in describing the invention that a layer 8 of relatively impervious rock overlies the strata which bear oil. It may also be assumed that the oil-bearing strata are located above another relatively impervious rock layer 10. Between these boundaries, there are, frequently, fairly well defined layers which may differ very considerably in permeability in the direction from the injection wells to the producing wells. These layers may, of course, slope or have various curvatures, but, commonly, they lie generally parallel to each other, and are conventionalized in the figure as extending generally horizontally. Some of the layers may be discontinuous; i.e., they may terminate or begin at various locations as viewed in the direction of flow.

Of the layers illustrated, those at 12 and 14 may be considered layers of relatively high permeability in the direction of their extent; layer 16 may be considered as of intermediate permeability; and layers 18 and 20 may be considered as having relatively low permeability. All of these layers will generally contain oil, possibly together with water and gas, and the desired result is that of driving their fluid contents from the location of the injection wells towards the producing wells. Considering the figure to the extent so far described, there may be readily visualized what would occur in accordance with conventional practices utilizing water or gas as the injected fluid, or utilizing additionally between the driving and driven fluids conventional slugs such as those of the so-called "miscible" type. Flow would occur so preferentially in the layers such as 12 and 14 that rapid displacement would occur therein as compared with such layers as 18 and 20. Thus these layers 12 and 14 of high permeability would be swept out and the driving fluid would reach through them the production wells long before substantial sweep through the low permeability layers would occur. Once a breakthrough of the driving fluid to the producing wells occurred, the effectiveness of the recovery process would be severely impaired. The remaining oil in the low permeability layers would then be recoverable less profitably or economically.

In accordance with the present invention, a viscous slug, of a type hereafter more fully described, is produced from slug-forming fluid materials introduced under pressure through the injection wells 4. This slug, shown in the condition following its formation, is indicated by the horizontally shaded region designated 22.

First, let it be assumed that the slug-forming fluid materials are introduced through the injection wells without the exercise of special control, the fluid flowing into the strata through conventional perforations in the casings of the wells. As this fluid enters the various layers, it will obviously meet with less resistance to flow in the high permeability layers with the result that, as injection proceeds, it will, at any time, radiate substantially further from the injection wells in the more permeable strata as compared with the less permeable strata. Ultimately, the viscous slug will inundate a region around the injection wells reaching, in the respective layers, the varying boundaries shown at 12', 14', 16', 18' and 20'. At the end of the slug formation procedure, it is generally desirable to have the slug volume of the order of 0.5% to 10% of the volume of oil-bearing fluid which is estimated to be in place in the reservoir. This quantity, however, is subject to extreme variation depending upon the nature of the formations as determined by coring in the drilling of the various wells in the reservoir and from data derived as the result of primary production. All of the physical characteristics of the reservoir, including dimensions, must be taken into account to ascertain the proper amount of material to be injected. From such knowledge good estimates of what should be done may be made considering the theoretical aspects of what is to occur as will now be described.

Following the injection of the materials, there will exist a slug separating the driving fluid from the driven fluid throughout the cross-section of the flow pattern, and this slug will accordingly be hereafter referred to as a viscous slug, since it will have an effective viscosity exceeding that of both the driving and driven fluids.

The driving fluid is now introduced under pressure and at the desired rate or rates through the injection wells.

Consider, now, the pressure conditions which will exist. Assume that the pressures at the injection wells are the same, though this, of course, need not be the case since deductions from the known existing conditions may indicate that the pressures should differ. Also assume, for simplicity, that the pressures existing at the producing wells are the same.

Consider, now, the conditions existing in a high permeability layer such as 12. As already indicated, the viscous slug will extend to a greater extent in the direction of flow in this layer as compared with layers of lower permeability, this being the result merely of injection of the slug-forming materials. The overall pressure gradient between the injection wells and the producing wells in this layer 12 will be made up of gradients comprising, first, that across the unswept region of this layer between the boundary 12' and the producing wells, and secondly, that between the injection wells and the boundary 12'. The former of these gradients will depend upon the velocity (volumetric) of displacement, the extent of its region in the direction of flow, the viscosity of the fluid in the unswept region, and the permeability of the layer 12. In the case of the portion of the slug in this same layer, the gradient between the injection wells and the boundary 12' is similarly dependent upon such matters, the velocity (volumetric) being the same and the permeability of the layer 12 being the same, but the viscosity of the slug material and the extent in the direction of flow being different. Since the velocity of flow at any point is a function of the pressure gradient, it will be evident that, as the slug has a greater extent in the direction of flow, the resulting pressure gradient moving the in situ fluid will be less so that for a given overall gradient the production rate through the well 6 from this layer will be less.

Consider next the low permeability layer such as 20. The viscosity of the in situ fluid is here the same as in the layer 12, but the permeability in this layer is less. The viscosity of the slug material in this layer is also the same as that of the same material in the more permeable layer. But because of the less horizontal extent of the slug material, the pressure drop tending to move the in situ fluid through the layer 20 may be much greater than in the more permeable layer.

Remembering that the initial penetration of the slug material as it was put in place was dependent upon similar pressure and volumetric velocity aspects, it will be evident that an automatic adjustment will have occurred to the end that, to a fair approximation, when driving fluid is now injected the volumetric displacement velocities in the various layers are more or less equalized, to the end that the slug will travel substantially as a unit, more or less maintaining its volumes in the respective layers, and driving the in situ fluid ahead of it toward the production wells much as if a rigid piston was operating through all of the layers simultaneously. Thus a more uniform sweep of the permeable layers occurs, with much improved condition of uniformity of removal of the desired fluid.

It may also be noted that the situation is to a considerable extent self-adjusting. Suppose, for example, that somehow the slug in the layer 20 was initially, or, became later, too extended in the direction of flow so as to offer so much resistance that displacement of the fluid in the layer 20 lagged behind that in the layer 12. The slug material in the latter layer would then advance more rapidly, tending to outdistance the slug in the layer 20. But as soon as this occurred, the "leakage" between layers would take place, and the viscous slug material would pass into the layer 12 following the slug material of the latter, so that the slug material in the layer 20 would be decreased in volume, with the resulting offering by it of less resistance to flow, with an accompanying increase of rate of displacement in the layer 20. Later, if flow conditions so required, a reverse interchange might well occur with flow back to layer 20. In effect, therefore, the "piston" provided by the viscous slug is more or less automatically adjusted in its configuration, always in a sense to tend to maintain equalization of displacement rates in the various layers. This automatic readjustment will also occur if the layers vary in relative thicknesses.

What has been described is obviously rather conventionalized for simplicity of consideration. Displacements and displacement rates have been treated as if they occurred essentially only along lines between the injection and producing wells. Obviously, the flow conditions are two-dimensional in the layers and the boundaries are not well-defined, though definition is usually reasonably sharp. But it will be evident, without further elaboration, that what has been described is more generally true for this two-dimensional type of flow. The boundaries between the slug and the driven fluid, and between the slug and the driving fluid, though curved, and varying with the progress of the drive, will, generally, conform to the desired conditions in which the slug as a whole, varying in its shape, will act essentially as a piston to drive the driven fluid uniformly through the various layers. As viewed from above the slug would appear as an annulus having rather irregular boundaries expanding outwardly with the drive and bulging towards the production wells, i.e., in the direction of freer flow. With its outward expansion its width would decrease, maintaining, however, substantial equalization of flows in the various layers by the actions already described.

In the foregoing discussion it was pointed out that generally the varying permeabilities of the layers would result in the introduction of slug-forming materials variably thereto in conformity with what is desired, even though no control of introduction of the slug-forming materials at various levels was effected. However, where observed conditions would seem to warrant, the slug-forming materials may be differentially injected into various layers by the use of packers in fashions well known in this art for injection of fluids where desired. By the use of packers, injection of the fluid or fluids may be cut off from the less permeable layers for selective major introduction into the more permeable layers, and proportioning of the amount of fluid or fluids introduced into the layers may be thus controlled. The initial volumetric shape of the slug may thereby be made whatever seems desirable to the operator. In a highly permeable layer, for example, it may be desirable to introduce a much greater amount of the slug-forming materials than would proportionately go thereinto merely by uncontrolled injection into all of the layers.

In accordance with the present invention, the viscous slug material is an emulsion which is produced in situ. In the application of Hardy and McArthur, Ser. No. 301,297, filed Aug. 12, 1963, now U.S. Patent No. 3,330,348, there is disclosed a secondary recovery process involving the provision of a slug in the form of a liquid-in-liquid emulsion, which slug is pre-formed at the surface by an emulsification procedure and introduced through one or more injection wells. While the formation and use of such an emulsion slug is highly advantageous, there is involved the necessity for producing the emulsion, a matter of substantial expense, and the disadvantage of the requirement of maintenance of stability of the emulsion up to the time of introduction into the reservoir. It is costly and not usually practical to form the emulsion at the well site; special apparatus is required for the formation of proper and reasonably stable emulsions. While an emulsion may be produced at a remote point and transported to the reservoir, special precautions must be taken to maintain the emulsion during the interval between its manufacture and use.

Furthermore, if the pre-formed emulsion is injected into the reservoir through one or more injection wells, its high viscosity properties, desired later in the recovery process, have some disadvantages. Resistance to flow is built up immediately outside the injection wells. Considering that the slug, acting as a piston, is intended to perform its functions remote from the injection region, where, in effect, it takes the form of an annulus of large average radius and must still have a dimension in the direction of travel sufficient to give it its piston-like action, it will be evident that a slug of adequate volume is quite large. But since this slug material must be introduced initialy over a very small area, amounting to the area of the exterior of a casing over a limited height, the slug as it is originally introduced will, before its introduction is terminated, extend through a quite large radius surrounding the injection region. This, then, represents the necessity for a drive of slug material in a linear direction through a very large distance, and the resistance to flow in this initial stage of introduction and initial drive is very high. It is only when the annulus becomes larger and remote from the injection region that its most desirable characteristic operation will take place.

By the formation of the slug in situ, the desired ultimate formation of a proper slug is secured but its establishment is relatively delayed both in time and distance from the injection point. The desired differences in extent of the slug as heretofore described are secured, but these are established to a primary extent during the period of production of the slug proper. The particular types of action which are involved will become more apparent later in consideration of particular aspects of the invention.

The emulsions which are produced in accordance with the invention may be of either of the two general types of oil-in-water emulsion and water-in-oil emulsions. In each case the two components are introduced in any of several fashions, one or both of them containing emulsifying agents. The introductions may be carried out in various fashions: The two components may be introduced simultaneously but separately at the region of entry into the formations; or they may be pre-mixed, though not emulsified, and introduced as a mixture; or they may be introduced in successive batches. Added to these are procedures in which advantage is taken of the presence of either residual water or residual oil in the formations.

In any of these cases, emulsification is provided by taking advantage of the inherent properties of the formations involved: namely, that they are constituted by permeable strata in which the pores or passages are quite fine and accordingly break up both constituents involved into minute streams which are so attenuated that, in the presence of emulsifying agents, the emulsification will occur. In fact, this action corresponds to one of the general fashions in which emulsions are produced, namely by the flow of the constituents in intimate relationship through small passages.

As will be evident, this type of emulsion formation involves time and distance of flow for its completion, and this contributes to the desirable aspects of the invention in production and placement of the emulsion slugs.

For a specific picture, there may be considered the formation of a water-in-oil emulsion to provide the slug. Let it be assumed, for simplicity, that the injection is through a single well, though obviously, and in practice, a plurality of injection wells may be provided and simultaneously used. Considering a casing perforated at the region where injection is desired, and tubing within this casing also having communication with the annulus between the tubing and casing, the two passages thus provided may be individually used for the independent introduction of the water and oil from the surface. It may be assumed that in this case the oil contains a suitable emulsifying agent which may typically be present in an amount up to 50% of the oil. The higher percentages, it may be noted, though greatly in excess of amounts required for emulsification of the materials introduced, will take care of the further emulsification of residual water and oil in the formations or, particularly, additional water which may be introduced later. As the oil and water are thus introduced, their streams through the formation are attenuated and admixed. But the formation of anything approaching a true homogeneous emulsion is substantially delayed so that the final or approximately final emulsion is formed only at a substantial distance from the point of injection.

However, while this is true, selective penetrations occur as previously described. The emulsion constituents will travel further and faster in the high permeability strata than in the low permeability strata, meaning that the former will contain greater quantities of the emulsion constituents than the latter. As, ultimately, the emulsion is formed, this situation continues to exist so that finally, but relatively remote from the injection well the more permeable strata will contain more emulsion than the less permeable strata. The result is the formation of a slug which has the proper properties for the drive as heretofore discussed.

Still referring, for consistency, to water-in-oil emulsions, for formation of viscous slugs, while what has been described refers to admixture of the constituents first at the region of injection, it will be evident that admixture, but short of emulsion formation, may be effected at the surface and the mixture caused to flow down a well through a single passage and into the formation. Such admixture may be effected either by the use of a separate mixer at the surface or, more conveniently and cheaply, merely by simultaneous introduction, in proper proportions, of the two constituents into the pump which forces the mixture downwardly through a well. A centrifugal pump, for example, preceding and forming the first stage of a high pressure pump will effect admixing though, usually, very little true emulsification. Even if considerable separation should occur in progress down the well, this is of little significance in view of the fact that as will be immediately brought out, the constituents may actually be injected as separate and successive batches.

Still referring to water-in-oil emulsion formation, an advantageous procedure, leading to relatively remote formation of a true emulsion, involves the introduction of all or a major part of the oil constituent, containing emulsifying agent, as a first batch, to be followed later by the separate introduction of water. When the oil enters the formation, it will flow relatively freely as such, penetrating differently the more permeable and less permeable strata. In its progress the oil will pick up and form an emulsion with residual water in the formations. But since the amount of water will be relatively low, as contrasted with that ultimately involved in the emulsion, the buildup of what is an effective emulsion will occur relatively slowly during the flow and consequently remote from the injection region. When the introduction of the oil is thus completed, therefore, what may be expected to exist is an emulsion which progressively increases in water content with distance from the injection point.

If this is now followed by the introduction of water, the oil will be driven forwardly, but adhering to the formation, will have flowing through it the introduced water which, because of the emulsifying agents and the attenuation of its streams will become emulsified in the oil. Emulsion formation thus progresses as the resulting growing emulsion moves outwardly, becoming more and more effective as the ultimately desired slug. While water has been just referred to as forming the emulsion with the previously introduced oil, it is obvious that this water may be merely the initial portion of an ultimate water drive which advances the now formed slug to secure the desired results.

It will now be evident that everything that has been said concerning water-in-oil emulsion formation is equally applicable to oil-in-water emulsion formation, except that water and oil may now be considered interchanged. The water may now contain the emulsifying agent, or both the oil and water may contain one or more emulsifying agents. With the last described successive batch type of introduction, a slug of water, preceding the oil, will pick and emulsify residual oils in the formation, while the following oil will be emulsified in the water in the same general fashion as described. If this procedure is adopted, the ultimate drive may be by gas followed by water. A miscible slug such as one of liquefied petroleum gas may advantageously be interposed between the introduced oil and the following gas, to secure the known advantages of the use of such a miscible slug.

As is well known, the type of emulsion formed is dependent upon the type of emulsifying agent which is used.

It is found that for optimum results it is desirable that the volume ratio of the dispersed to continuous phases should be between 20:1 and 2:1, either when the emulsion is of the water-in-oil type or of the oil-in-water type.

While the total volume of a slug used for a particular reservoir is subject to wide variations as dictated by optimum conclusions as to what is most desirable taking into consideration the known aspects of the reservoir, it has generally been found that attainment of best results are indicated when the ultimate emulsion has a volume of the order of 2% to 25% of the volume of the residual liquids in the formation which it is contemplated will be swept.

It may be noted that when indications are that a highly viscous slug should be used, viscosity may be increased by increasing the viscosity of the liquid forming the continuous phase. In the case of formation of a water-in-oil emulsion, the oil may be of naturally high viscosity type such as high viscosity crude oil, or a less viscous oil may have its viscosity increased by the addition of such materials as olefin polymers, stillbottoms, or high viscosity crude oil. In the case of oil-in-water emulsions, the aqueous phase may have its viscosity increased by the incorporation of carboxy methyl cellulose or other gel-forming or viscosity-producing materials.

As the continuous phase of a water-in-oil emulsion, there may be used liquefied petroleum gas either alone or containing a viscosity-increasing material, and the advantages of the invention already described may be achieved with the additional advantage of providing a miscible slug with its known result of effecting a more complete removal of the desired petroleum content under gas drive. Whatever the type of slug used, the drive may be either by gas or by water, but gas drive is desirable when a miscible slug is used. A gas drive may, of course, be followed by a water drive.

The effective viscosity of the slug of emulsion is not so much due to the actual viscosity of the continuous phase as to the so-called Jamin effect. The Jamin effect is due to the resistance to flow produced by the material forming the discontinuous phase which, in a sense, blocks the pores of the formation so that the slug material, viewed as a whole, has an apparent high viscosity exceeding that of the fluids in the reservoir. Desirably the viscosity of the slug is 20% or more higher than that of the oil to be displaced. This effective viscosity may be further increased by actual increase of viscosity of the continuous phase. Thus, a wide range of viscosity may be made available for use in accordance with the results desired.

Emulsions are advantageous in that they exhibit the properties of a rheopectic material during their formation, that is to say one which has the characteristics of exhibiting an increase in viscosity during intense agitation. A more accurate statement would be that during the formation of emulsions the shear stress increases with time with subjection to a constant agitation, the behavior being different from that of a thixotropic material which exhibits a decrease in shear stress with time. The high velocity channels will thus create a higher hydraulic resistance because of the favorable conditions for formation of emulsions in them with attendant increase in viscosity, as is desirable in the case of a mobile slug of the type herein considered. If flow in the channels ceased completely or became quite slow, the emulsion would have a tendency to break reducing the hydraulic resistance and thereby reestablishing flow.

What should be used will generally be determined by preliminary tests of flow conditions using samples of porous materials corresponding to those secured by coring of the formation, introducing to these emulsions such as it will be known will be ultimately produced in the formations. As is well known, deductions as to flow conditions may be made by taking into consideration previous history of the particular reservoir being operated. The deductions are made from pressure and flow measurements, composition of produced fluids, etc. The engineers in charge of operations may thus make their best estimates as to the desired properties of a slug to be used for driving purposes. Numerous emulsifying agents known in the art may be used, for example those of the type described in the Brown Patent 3,032,499. Useful, for example, are the organic acid-additive salts of N-higher alkyl substituted alkylenepolyamines. An optimum ratio of constituents in the water-in-oil type of emulsion would appear to be 84.5% water, 14.5% oil and 1% of the type of emulsifying agent just mentioned. In the case of an oil-in-water emulsion, an optimum composition appears to be 83.5% oil, 15% water and 1.5% polyoxyethylene (20) sorbitan monostearate. It may be noted that in the two formulations just given the emulsifying agents are of low percentage. These percentages refer to the ultimate emulsion which is produced. At the time of introduction the continuous phase, oil in the first instance and water in the second, may contain much higher percentages of these emulsifying agents (for example up to 50%) to take care of the fact that as production of the emulsion occurs both of the constituents increase both from additions thereof and from accumulation from the residual materials in the formations. In other words, the emulsifying agents are provided in such quantities as to produce good and stable emulsions when the total amounts of the emulsion are as contemplated.

In the case of formation of oil-in-water emulsions typical emulsifying agents may be polyoxyethylene sorbitol monostearate, polyoxyethylene sorbitol monopalmitate, polyoxyethylene sorbitol monooleate, polyoxyethylene stearate, polyoxyethylene oxypropylene stearate, polyoxyethylene lauryl alcohol, polyoxyethylene cetyl alcohol, polyoxyethylene stearyl alcohol, polyoxyethylene oleyl alcohol, acid stable glyceryl monostearate, or alkyl aryl sulfonate.

In the case of formation of water-in-oil emulsions the emulsifying agents may be, for example, sorbitan sesquioleate, sorbitan monooleate, sorbitan trioleate, sorbitan monostearate, sorbitan tristearate, sorbitan monopalmitate, sorbitan monolaurate, glyceryl monostearate, or glyceryl monooleate.

As an example of the application of the invention, the process of the invention was carried out in a field in which water flooding had been carried out, and the wells were completed in a sand which was characterized by 18.5% porosity, 300 millidarcys permeability and a heterogeneity factor of 8, this factor being defined as the ratio of the capacity of the highest permeability laminae to the average capacity of the formation. The in situ generation of the emulsion was effected using oil soluble emulsifying agents and the technique of introducing separately water and hydrocarbon through the passages within tubing and between the tubing and casing of an injection well. The fluids injected consisted of 325 barrels of lease crude oil, 225 gallons of an emulsifying agent consisting primarily of organic acid-additive salts of N-higher alkyl substituted alkylenepolyamines. The emulsifying agent was added to the oil prior to its injection into the formation. The oil and emulsifying agent were pumped into the injection well over a period of approximately eleven hours. After the oil and emulsifying agent had entered the formation normal water injection was resumed. Changes in the water-oil ratio in offset wells 650 feet from the injection wells indicated that an emulsion was formed in situ resulting in a decrease in water-oil ratio from 35:1 to 30:1. After twelve weeks, samples of the emulsion were produced from a first row of producing wells.

It will be evident that numerous variations in procedure may be adopted depending upon conditions observed, and the invention is accordingly not to be considered as limited except as required by the following claim.

What is claimed is:

The secondary recovery method for petroleum-containing fluid from a reservoir containing said fluid in layered formations of varying permeabilities which includes:

introducing through at least one injection well into said reservoir an aqueous material, without substantial oil content, including at least one emulsifying agent to produce in the reservoir at a location remote from the injection well in combination with residual fluid in the reservoir, a slug having the form of an emulsion with a liquid continuous phase and a liquid discontinuous phase;

the emulsion slug having a higher effective viscosity due to the Jamin effect than the petroleum-containing fluid in the reservoir and higher than the injected aqueous material and varying in penetration into said formations; and then providing a fluid drive through the same injection well to advance said slug to drive before it the petroleum-containing fluid towards at least one producing well.

References Cited

UNITED STATES PATENTS

| | | | |
|---|---|---|---|
| 2,288,857 | 7/1942 | Subkow | 166—7 |
| 2,988,142 | 6/1961 | Maly | 166—9 |
| 3,032,499 | 5/1962 | Brown | 252—8.55 |
| 3,074,481 | 1/1963 | Habermann | 166—9 X |
| 3,149,669 | 9/1964 | Binder et al. | 166—9 |
| 3,174,542 | 3/1965 | Reisberg | 166—9 |

STEPHEN J. NOVOSAD, *Primary Examiner.*